United States Patent [19]

Kirrish et al.

[11] 4,204,566
[45] May 27, 1980

[54] SCREW AND CAPTIVE COMPRESSION SPRING FASTENER ASSEMBLY

[75] Inventors: Hail Kirrish; Jon R. McCauley, both of Rockford, Ill.

[73] Assignee: Textron Inc., Providence, R.I.

[21] Appl. No.: 876,550

[22] Filed: Feb. 10, 1978

[51] Int. Cl.² ............................................. F16B 39/24
[52] U.S. Cl. .................................................... 151/38
[58] Field of Search ................. 151/14 CS, 38, 30, 69, 151/1 R

[56] References Cited

U.S. PATENT DOCUMENTS

| | | | |
|---|---|---|---|
| 3,437,119 | 4/1969 | Dey | 151/69 |
| 3,505,921 | 4/1970 | Wigam | 151/69 |
| 3,746,067 | 7/1973 | Gulistan | 151/69 |
| 3,777,796 | 12/1973 | Takano | 151/38 |
| 3,913,649 | 10/1975 | Stanaitis | 151/38 |
| 4,064,921 | 12/1977 | Kose | 151/38 |

FOREIGN PATENT DOCUMENTS 558456  6/1958  Canada ..................................... 151/69

Primary Examiner—Francis K. Zugel

Attorney, Agent, or Firm—Trexler, Wolters, Bushnell & Fosse, Ltd.

[57] ABSTRACT

There is disclosed a fastener assembly comprised of a screw fastener member having a driver head, a threaded shank portion and an unthreaded shank portion intermediate the threaded shank portion and the driver head. The unthreaded shank portion also includes a protruding portion defining an effective diameter greater than the major diameter of the threaded portion. This portion is formed by rolling a groove into the unthreaded shank portion in such a manner as to provide an annular projection having a tapered surface portion. There is further included a helical compression spring member having at least one end portion formed to an inner diameter larger than the major thread diameter, but smaller than the diameter of the protruding portion of the unthreaded shank portion. The compression spring is co-axially interfitted with the screw member with a selected one of the end portions axially advanced so as to be expanded and engaged over the protruding portion, thereby maintaining the spring member in captive relation at the unthreaded shank portion between the protruding portion and the driver head.

2 Claims, 3 Drawing Figures

SCREW AND CAPTIVE COMPRESSION SPRING FASTENER ASSEMBLY

BACKGROUND OF THE INVENTION

This invention relates generally to fasteners and more particularly to a fastener assembly comprising a screw and a captive compression spring.

The use of a compression spring as a locking member for a screw fastener is generally known in the prior art. For example, such an arrangement is commonly utilized as an adjustable idle screw for automotive carburetors, as it provides a considerable range of adjustment by allowing variable degrees of advancement of the screw with respect to its screw threads. The compression spring acts to maintain the screw at a desired degree of advancement, substantially preventing further rotation of the screw in either direction as might occur, due to vibration or the like.

Heretofore, however, these screws and springs have been provided separately by the manufacturer or manufacturers. Consequently, the screw fastener and spring must be assembled by a worker during the manufacture or assembly of a device such as a carburetor with which the screw and coil spring assembly is to be utilized. Accordingly, it is possible for the installer or assembly line worker to choose the wrong combination of screw and compression spring for installation, or improperly assembly or even neglect or forget to assemble the compression spring with the screw member prior to installation thereof. Thus, provision of a fastener assembly comprising a screw member with a captive compression spring member substantially eliminates these problems and facilitates the assembly operation. Moreover, it will be appreciated that such provision of a captive compression spring member is advantageous to the ultimate user in that it saves considerable time and trouble involved in selecting complimentary screw members and spring members independently and often from different manufacturers, and in providing a reliable supply of such properly selected and mated parts at the point of ultimate assembly and/or installation.

Accordingly, it is a general object of this invention to provide a fastener assembly comprising a screw member and a captive compression spring member.

A more specific object of this invention is to provide a fastener assembly of the type described wherein both screw and compression spring to the specifications of the user may be readily and easily selected and pre-assembled.

Another object is to provide a fastener assembly of the type described which may be relatively simply and inexpensively manufactured, assembled by even relatively unskilled workers, and yet remains relatively rugged and reliable in operation.

Briefly, and in accordance with the foregoing objects, a fastener assembly according to this invention comprises a screw member including a driver head, a threaded shank portion and an unthreaded shank portion intermediate said driver head and said threaded shank portion. A generally helical elongate compression spring member cooperates with protrusion means on said unthreaded shank portion so as to hold at least an end portion of said compression spring member in captive relation on said screw member, substantially coaxially therewith.

Other objects, features and advantages of this invention will become more readily apparent upon consideration of the following detailed description of the illustrated embodiment, together with the accompanying drawings.

DETAILED DESCRIPTION OF THE ILLUSTRATED EMBODIMENT

Figure 1:
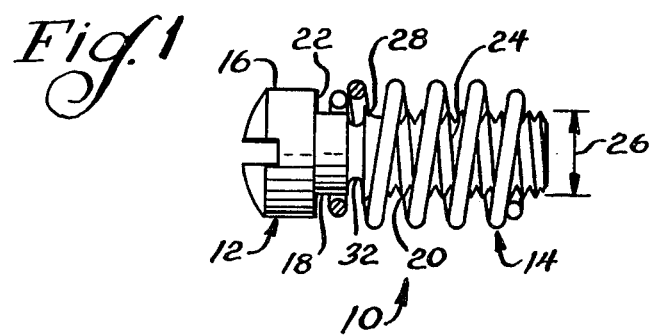
FIG. 1 illustrates a fastener assembly according to this invention in side elevation and partially cut away.
Figure 3:
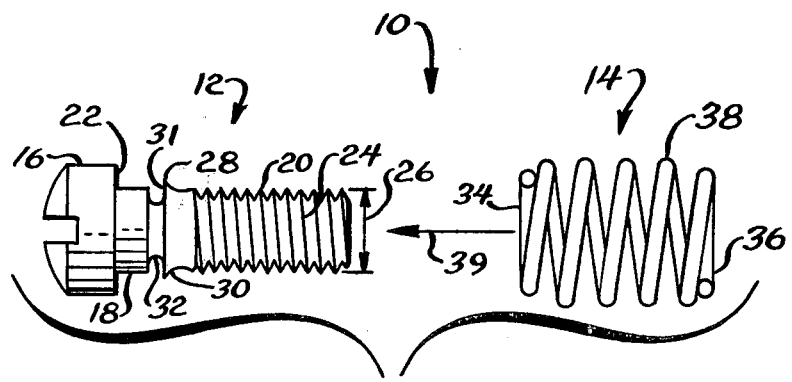
FIG. 3 illustrates, in side elevation, a screw member and compression spring exploded apart to indicate the assembly of the fastener assembly of this invention.

Referring to the drawing Figures, and initially to FIG. 1, a fastener assembly according to the present invention is illustrated and designated generally 10. The fastener assembly 10 comprises, broadly speaking, a screw member 12 and a coil compression spring member 14. As best seen in FIG. 3, the screw member 12 includes a drive head 16 which may be configured in accordance with conventional practice to accept a tool such as a screw driver or the like. The drive head is confluent with a first or unthreaded shank portion 18 and of sufficient diameter to present a bearing surface 22 at its confluence with the shank portion 18. A second or threaded shank portion 20 is confluent with the first or unthreaded shank portion 18, and includes a thread designated generally 24. The major diameter of the thread 24 is indicated by the arrows 26, and is substantially similar to the diameter of the unthreaded shank portion 18.

A protrusion or protruding portion 28 is formed in the unthreaded shank portion 18 proximate the threaded shank portion 20. In the illustrated embodiment, the protrusion 28 comprises a generally annular or radially outwardly extending flange or shoulder defining an outer diameter somewhat greater than the major diameter 26 of thread 24, and consequently also greater than the diameter of the unthreaded shank portion 18. Further, in the illustrated embodiment, it will be seen that the annular flange 28 includes a leading surface 30 which is sloped radially outwardly of the threaded shank portion 20. In contrast, the opposite side of the annular flange 28 defines a rather abrupt wall 31 which comprises a radially outwardly extending surface with respect to the unthreaded shank portion 18.

Preferably the flange 28 is provided by the formation of an annular groove or trough 32 in the unthreaded shank portion 18. This formation process involves upsetting or cold forming the shank 18 to flow the material thereof axially to produce flange 28.

Still referring to FIGS. 1 and 3, the spring member 14 generally comprises a conventional helical or coiled compression spring of substantially similar length or axial dimension to the threaded shank portion 20 of the screw member 12. In the illustrated embodiment, the compression spring member 14 has first and second substantially identical, oppositely disposed end portions 34 and 36 which define inner diameters somewhat greater than the major diameter 26 of thread 24, but smaller than the diameter of the protrusion or flange 28. An intermediate portion 38 of the spring 14 defines an internal diameter at least as great as the end portions 34 and 36. The end portions 34 and 36 of the spring 14, as best seen in FIG. 3, are also closed and squared, to provide bearing surfaces at opposite ends of the spring 14.

As indicated by the arrow 39 in FIG. 3, the spring 14 may be axially moved, with its end portion 34 leading, to surround the threaded shank portion 20 of the screw member 12. When the leading end portion 34 engages the slope or leading edge portion 30 of the protrusion 28, it will resiliently expand somewhat to pass thereover and around the protrusion 28. Once clear of the protrusion 28, the resilient material of the spring end portion 34 will return to its original diameter and thus be held rotatably in captive relation between the wall 31 of the protrusion 28 and bearing surface 22 of the driver head 16. The spring member 14 thereby assumes a coaxial, assembled relation with the screw member 12, as illustrated in FIG. 1. Thus, the bearing surface 22 of the driver head 16 is engageable with the bearing surface provided by the squared and closed end portion 34 of the spring 14 to effect compression of the spring 14 upon advancement of the screw 12 with respect to a facing surface of a carburetor or the like, with which the assembly 10 is to be utilized.

Figure 2:
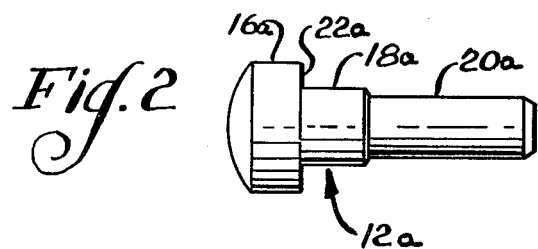
FIG. 2 illustrates, in side elevation a screw blank utilized in making the screw member of the assembly of this invention.

Referring now to FIG. 2, the manner in which the screw member 12 is formed will be described in greater detail. Initially, a screw blank 12a is provided having a head portion 16a, a first shank portion 18a and a second shank portion 20a. The thread 24 may then be formed on the shank portion 20a by conventional means such as cold rolling. The groove 32 and correspondingly the protrusion 28, with its surfaces 30 and 31, as illustrated and described with reference to FIG. 3, may also be formed by a similar cold rolling or upsetting process. Advantageously the formation of the threads 24 and protrusion 28 may take place simultaneously by utilizing a suitable die or like apparatus. It will be appreciated that the formation of both threads 24 and protrusion 28, in accordance with conventional cold rolling techniques, requires some upsetting or displacement of material, whereby the major diameter 26 of the threads 24 of FIG. 3 is somewhat greater than the diameter of the shank portion 20a of FIG. 2. Similarly, the annular groove or depression 32 is formed simultaneously with the protrusion 28. Accordingly, the diameter of the shank portion 18a of the blank 12a is chosen substantially to coincide with the major diameter 26 of the thread 24 to be formed on the shank portion 20a.

While a protrusion or flange 28 provided by the groove 32 has been described in connection with the drawings, and constitutes a preferred embodiment, it will be appreciated that alternative forms of protrusion means may be utilized without departing from the principles of this invention.

While a preferred embodiment has been illustrated and described, the present invention is not so limited. On the contrary, various alternatives, changes and modifications may suggest themselves to those skilled in the art, and such alternatives, changes and modifications are to be considered as forming a part of this invention insofar as they fall within the spirit and scope of the appended claims.

The invention is claimed as follows:

1. A fastener assembly, comprising in combination; a screw fastener member and generally helical elongate compression spring member made up of at least three full helical loops, and captively mounted on said fastener member, said spring including oppositely disposed end portions and an intermediate portion extending a substantial distance along the length of said screw fastener member, said screw fastener member including an elongate shank having a driver head formed on one end thereof and including drive tool engagement means, a threaded shank portion including a thread formed therein and having a major thread diameter of a first dimension, and an unthreaded shank portion intermediate said driver head and said threaded shank portion, protrusion means formed on said unthreaded shank portion for maintaining said compression spring member in captive relation on said screw member, said protrusion means including, an annular sloped wall surface facing generally away from said driver head with a major portion of said sloped wall surface having a maximum dimension greater than said major thread diameter, and an abrupt radially disposed wall surface spaced from and facing toward said driver head, said protrusion means wall surface merging to define a crest having an effective diameter larger than said major thread diameter, and said elongate compression spring member having a pair of opposite end portions each provided by a resilient, expandable loop defining an inner diameter significantly less than the effective diameter of said protrusion means, with the loops of said spring member defining said end portions and said intermediate portion having inner diameters greater than said major diameter of the threaded shank portion, such that said spring member can be disposed over said threaded shank with either of said end portions engaged with the sloped wall surface of said protrusion means causing the respective loop to expand, such that either of said end portions can be engaged over said protrusion means with a snap-fit type of action, and disposed intermediate said driver head and said protrusion means, with said abrupt wall surface of said protrusion means maintaining said spring member in captive relation on said fastener member.

2. A fastener assembly according to claim 1 wherein said protrusion means is provided by an annular ring upset from the surface of said unthreaded shank portion.

* * * * *